Aug. 26, 1969  A. W. CHURCHILL  3,463,443
VALVE HAVING RELEASABLE LATCH MECHANISM
Filed Oct. 11, 1967  2 Sheets-Sheet 1
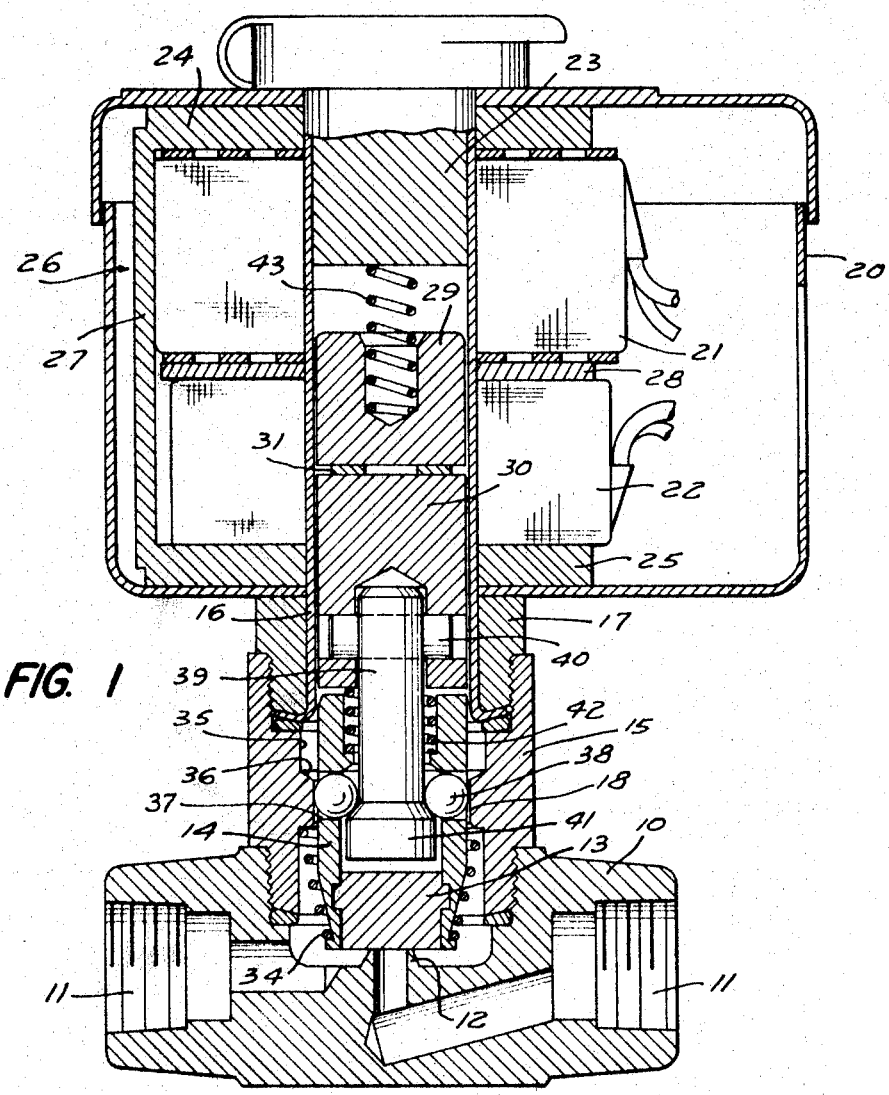
INVENTOR:
ALAN W. CHURCHILL
BY
ATTORNEYS

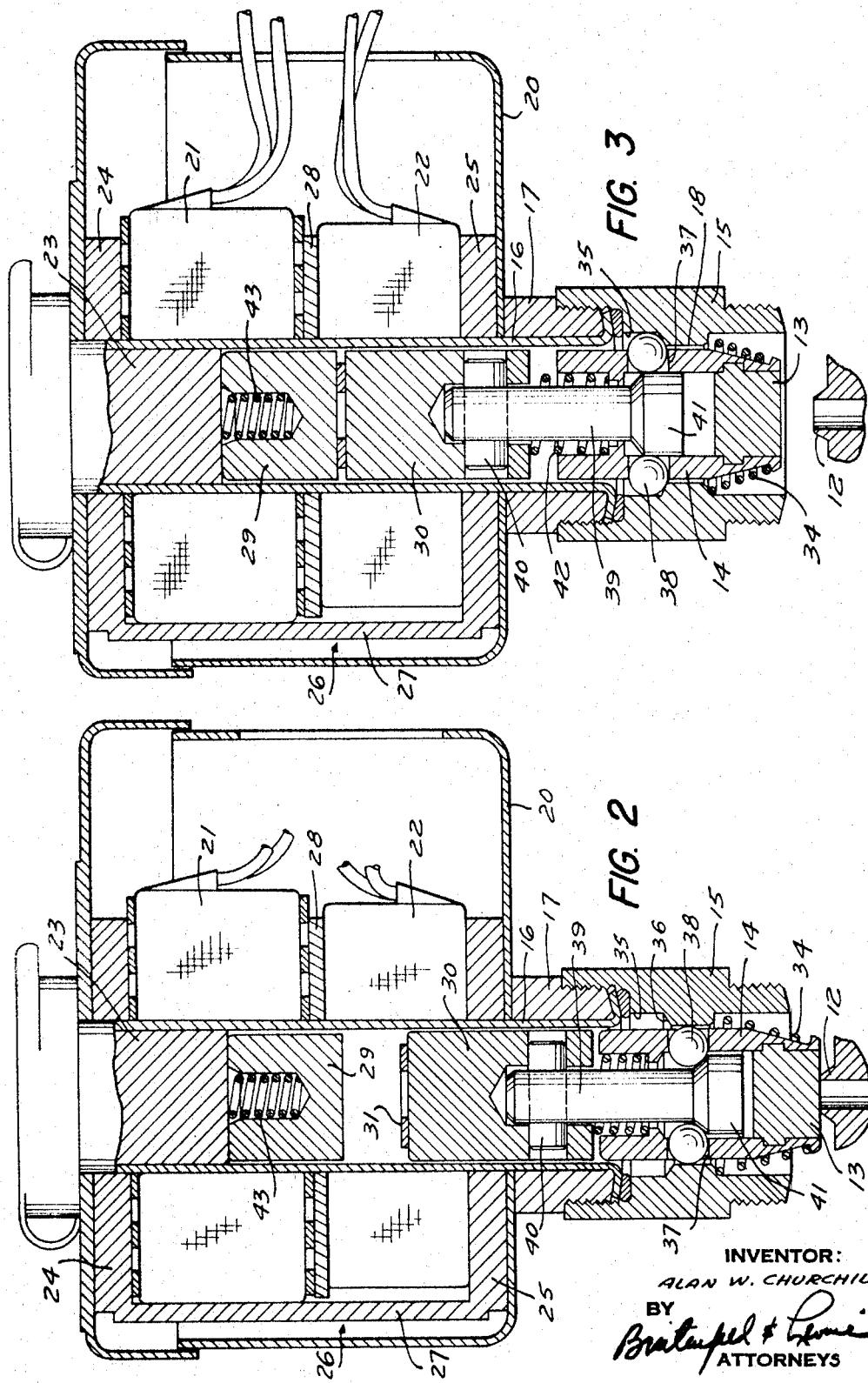

# United States Patent Office 3,463,443
Patented Aug. 26, 1969

3,463,443
VALVE HAVING RELEASABLE LATCH MECHANISM
Alan W. Churchill, Morristown, N.J., assignor to Automatic Switch Company, a corporation of New York
Filed Oct. 11, 1967, Ser. No. 674,462
Int. Cl. F16k 31/10, 17/04
U.S. Cl. 251—70      7 Claims

ABSTRACT OF THE DISCLOSURE

Valve body has seat and elongated opening slidably accommodating valve disk carrier. Inner wall of opening has recess, and carrier has transverse hole accommodating a ball. Stem within carrier is connected to armature of one solenoid, and has wedging portion which pushes ball into recess to latch valve when stem is lifted. Armature of second solenoid forms part of magnetic circuit of first solenoid so that second solenoid must be energized before movement of first solenoid armature can be effected.

---

This invention relates to solenoid valves, and more particularly to such a valve having a valve member which may be releasably latched in its open condition. A valve of this general character is shown in my copending application Ser. No. 455,165, filed May 12, 1965.

In many types of installations, such as combustion control systems for ovens or boilers, it is required that certain safety precautions be observed before and during operation of the equipment. Specifically, fuel supply valves must not be opened until safe conditions are present, and should be closed if an unsafe condition arises during operation. Conventionally, where the valve to be controlled is solenoid operated, these requirements are met by placing the switch of an electrical relay in the circuit which energizes the solenoid operator, and connecting the safety devices in series with the holding coil of the relay, so that the relay will not close, and the valve will not open, until all the safety devices are closed.

This conventional arrangement has several disadvantages. First, it is relatively large and complex involving use of both a solenoid valve and a relay. Second, it is uneconomical because both the solenoid and the relay coil must remain energized while the valve is open. Third, an operator can by-pass the safety devices by merely holding the relay closed by hand.

It is a general object of the present invention to overcome these disadvantages by providing a solenoid valve which cannot be opened until safety devices in circuit with it are closed. Thus, the need for a separate relay is eliminated.

It is another object of the invention to provide such a valve which cannot be opened by an operator unless and until the safety devices in circuit with it are closed.

It is a further object of the invention to provide such a valve which requires only a small current flow to maintain it in open condition.

To accomplish these objectives, the invention provides a valve disk carrier slidable within an elongated opening in the valve body, and a pair of coaxial solenoids each having a movable armature. Means including a latching arrangement interconnects one of the armatures and the carrier. The latching arrangement comprises a stem having a wedging portion within the carrier, and a ball accommodated within a transverse opening in the carrier. Lifting of the stem by the armature causes the carrier to be lifted until the wedging portion moves the ball radially into a recess in the inner wall of the valve body opening. The carrier is thereby latched in a valve open condition against the force of a closing spring.

The armature of the second, or conditioning, solenoid forms part of the magnetic circuit of the first-mentioned, or actuating, solenoid and serves to close that magnetic circuit when the conditioning solenoid is deenergized. Hence, energization of the actuating solenoid has no effect if the conditioning solenoid has not first been energized to open the magnetic circuit of the actuating solenoid. Furthermore, an unlatching spring is rendered ineffective by the conditioning solenoid armature when the latter solenoid is energized. Hence, when the valve is latched open, should the conditioning solenoid become deenergized, the latch will be opened by the unlatching spring and the valve will close. Thus, it is clear that if the safety devices of the installation in which the present valve is used are connected in series with the conditioning solenoid, the valve can only be opened when all safety devices are closed, and the valve will close as soon as any safety device opens. In addition, with the conditioning solenoid energized, the actuating solenoid need only be energized for an instant to latch the valve open. Thereafter, only the small current needed to maintain the conditioning solenoid energized is required to keep the valve open.

Additional features and advantages of the invention will be apparent from the following description in which reference is made to the accompanying drawings.

In the drawings:

FIG. 1 is a longitudinal cross-section of a valve according to this invention, the valve being closed and the conditioning solenoid being deenergized;

FIG. 2 is a view similar to FIG. 1, the valve being closed and the conditioning solenoid being energized;

FIG. 3 is a view similar to FIG. 1, the valve being open and the conditioning solenoid being energized; and FIG. 4 is a schematic view showing how the solenoids of the present valve might be connected to energizing circuits.

The valve chosen to illustrate this invention comprises a valve body 10 having inlet and outlet openings 11, a valve seat 12 between them, and a valve disk 13 arranged for movement toward and away from the valve seat. The disk 13 is secured to the lower end of a valve disk carrier 14, the carrier being slidably arranged within an elongated opening 18 in a member 15 threadably secured at one end to the valve body 10. At its other end, the member 15 is secured to the lower end of a solenoid core tube 16 by a nut 17.

Supported on the core tube 16 is a solenoid housing 20 enclosing a pair of independent coaxial solenoids 21 and 22 surrounding the core tube. Also surrounding the core tube and separating the two solenoids is a washer 28 of magnetic material. The core tube 16 is formed of non-magnetic material, and tightly accommodated within its upper end is a plug nut 23 of magnetic material. The solenoids 21 and 22 are sandwiched between the horizontal arms 24 and 25 of a magnetic yoke 26, the arms being joined by a back 27. The yoke arms 24 and 25 are provided with holes through which the core tube 16 passes, and if desired the arms and back of the yoke may be integrally formed. Axially slidable within the core tube 16 is an armature 29 controlled by solenoid 21, and an armature 30 controlled by solenoid 22. The armatures may be separated by a nonmagnetic washer 31.

A compression spring 34 constantly urges the carrier 14 toward the valve seat 12, and when the valve is closed the spring 14 presses the disk 13 against the seat. A latching arrangement is provided for maintaining the valve open against the force of the spring 34. This arrangement is of the ball-lock type, and includes an annular recess 35 formed in the inner wall of the opening 18 in the member 15, an inclined shoulder 36 being formed at the end of the recess closest to the valve seat 12. The disk carrier 14 is provided with a transverse hole 37 so located that it can be brought into and out of registry or alignment with the recess 35 as the carrier 14 and member 15 move relative to each other. Thus, in FIG. 1 the hole 37 and recess 35 are out of alignment, whereas in FIG. 3 alignment has been established. Mounted for free movement within the transverse hole 37 is a ball 38 whose diameter is only slightly less than that of the hole 37 but greater than the depth of the recess 35. Preferably, the hole 37 extends diametrically through the carrier 14, as shown, and there is a ball 38 at each end of the hole.

The carrier 14 and armature 30 are interconnected by means of a stem 39 slidably arranged within the carrier. The upper end of the stem is secured to the armature 30 by a pin 40 passing through aligned holes in the armature and stem. The lower end of the stem 39 is formed with an enlarged wedging portion 41. The combined radii of the wedging portion 41 and ball 38 exceeds the radius of the opening 18. Consequently, when the valve is closed, as in FIG. 1, the balls 38 are located in the path of upward movement of the wedging portion 41. However, the combined radii of the wedging portion and ball is less than the radius of the recess 35; hence when the hole 37 and recess 35 come into alignment (FIG. 3), the wedging portion can push the balls 38 into the recess 35 and move into radial alignment with the balls. A latch spring 42 surrounds the stem 39 and constantly urges the carrier 14 and armature 30 apart. An unlatching spring 43, stronger than the spring 42, constantly urges the armature 29 away from the plug nut 23.

The operation of the present valve will be described by first referring to FIG. 4 which illustrates the energizing circuits for the solenoids 21 and 22. The conditioning solenoid 21 is connected to the power source 46 in series with a number of switches 47 which form parts of various safety devices of any well known kind. The actuating coil 22 is connected to the power source 46 via an operating switch 48. If any one of the switches 47 is open so that the conditioning solenoid 21 is deenergized, the valve will be closed as shown as shown in FIG. 1 due to the action of closing spring 34. Also, the armature 29 is held against armature 30 by unlatching spring 43. In this condition (a switch 47 open), should the operating switch 48 be closed to energize the actuating coil 22, no movement within the valve will take place. The reason is that the magnetic circuit for the actuating solenoid 22 is completed through the lower arm 25 and back 27 of yoke 26, washer 28, armature 29 of the conditioning solenoid, and armature 30 of the actuating solenoid. As can be seen clearly in FIG. 1, no motion of the parts would serve to decrease the length of this magnetic path, and hence no motion occurs.

Now, should all the safety device switches 47 close to energize the conditioning solenoid 21, while the operating switch 48 remains open and hence actuating solenoid 22 deenergized, the parts will assume the condition shown in FIG. 2. The only change in the position of the parts between the positions of FIGS. 1 and 2 is that the armature 29 of the conditioning solenoid has moved away from the armature 30 and into engagement with the plug nut 23, while compressing the unlatching spring 43. The reason for this movement involves the magnetic circuit for the conditioning solenoid 21, which includes the upper arm 24 and back 27 of yoke 26, washer 28, armature 29 and plug nut 23. It will be seen, by comparing FIGS. 1 and 2 that the length of this magnetic circuit is significantly reduced by movement of the armature 29 toward the plug nut 23.

With movement of the armature 29 to the position shown in FIG. 2, a gap is created in the magnetic circuit of the actuating solenoid 22, the gap being between the two armatures 29 and 30. Consequently, should the switch 48 now be closed, even for only an instant, energization of the actuating solenoid 22 will cause the parts to move to the condition shown in FIG. 3. This shift is engendered by movement of the armature 30 toward the armature 29 to close the gap between them and thereby shorten the length of the magnetic circuit for the actuating solenoid 22.

This upward movement of the armature 30, from the position of FIG. 2 to that of FIG. 3, is transmitted to the stem 39 via pin 40. The upward movement of the wedging portion 41 of the stem is transmitted to the balls 38 which in turn transmit the motion to the disk carrier 14. Thus, during the initial upward movement of the stem 39, the carrier 14 rises with it, effecting the opening of the valve. When the hole 37 in the carrier 14 comes into registry with the recess 35, as shown in FIG. 3, continued upward movement of the stem 39 causes the wedging portion 41 to push the balls 38 radially outward into the recess 35. As long as the wedging portion 41 remains in the plane of the balls 38, the balls are held in the recess 35. In this position, the balls 38 are operatively interposed between the carrier 14 and member 15, thereby preventing downward movement of the carrier 14 under the influence of closing spring 34. Should the solenoid 22 be deenergized after the latched condition shown in FIG. 3 is achieved, the latching spring 42 will keep the armature 30 in its raised condition against armature 29, and hence the valve remains open although only conditioning solenoid 21 is energized.

Upon deenergization of conditioning solenoid 21, unlatching spring 43 pushes the armatures 29 and 30 downwardly overcoming the upward force of latching spring 42. Consequently, stem 39 and its wedging portion 41 move downwardly, whereupon the balls 38 roll inwardly along the shoulder 36 of recess 35. The carrier 14 and member 15 are thereby unlatched, and the spring 34 moves the valve disk 13 against the seat 12 (FIG. 1) to close the valve. It should be noted that this reaction to deenergization of the conditioning solenoid 21 occurs whether or not the actuating solenoid 22 is energized.

It will be appreciated that this invention provides a valve which can be opened, upon energization of the actuating solenoid 22, only when the conditioning solenoid 21 is in energized condition, and which will close as soon as the conditioning solenoid is deenergized regardless of whether or not the actuating solenoid is energized.

Non-magnetic washer 31 is not essential, but its presence helps to isolate the magnetic circuits of the two solenoids so that the armature 29 can be pushed away from plug nut 23 with a weaker spring 43 than would otherwise be necessary, if actuating solenoid 22 is energized at the time conditioning solenoid 21 is deenergized. In addition, although a single magnetic yoke 26 is illustrated which forms parts of both magnetic circuits, separate yokes for the two solenoids could be employed.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A valve comprising:
   (a) a valve body formed with
      (I) a valve seat, and
      (II) an elongated opening aligned with the axis of said valve seat, the inner wall of said opening having a recess;
   (b) a valve disk carrier slidably arranged within said opening, said carrier having a transverse hole so located that it comes into alignment with said recess when said carrier is moved away from said valve seat;
   (c) a ball within said hole movable radially into said recess when alignment occurs, said recess being of less depth than the ball diameter;

(d) a stem slidably arranged within said disk carrier, said stem having a wedging portion which urges said ball radially outwardly upon movement of said stem away from said valve seat;

(e) a spring urging said carrier toward said valve seat;

(f) a conditioning solenoid having a movable armature; and (g) an actuating solenoid having a movable armature which upon energization of both solenoids lifts said stem and carrier away from said valve seat against the force of said spring, said stem wedging portion serving to push said balls into said recess upon alignment of said hole and recess to thereby latch said carrier and render said spring temporarily ineffective;

(h) said carrier thereafter remaining latched in valve-open condition so long as said conditioning solenoid remains energized regardless of the state of said actuating solenoid.

2. A valve as defined in claim 1 including means forming a magnetic circuit for each of said solenoids, the aramature of said conditioning solenoid forming part of the magnetic circuit for said actuating solenoid, and said armatures being adjacent to each other when said conditioning solenoid is deenergized, whereby in the latter circumstance the magnetic circuit for said actuating solenoid is completed so that energization of said actuating solenoid does not produce movement of its armature.

3. A valve as defined in claim 2 wherein a gap exists in the magnetic circuit of said conditioning solenoid when the latter is deenergized, energization of said conditioning solenoid causing movement of said contitioning solenoid armature away from said actuating solenoid armature to close said gap and create a gap in the magnetic circuit of said actuating solenoid.

4. A valve as defined in claim 3 including a latching spring for urging said stem in a direction which causes its wedging portion to push said ball outwardly and thereby maintain the valve latched in open condition even after deenergization of said actuating solenoid, and an unlatching spring urging said conditioning solenoid armature toward said valve seat, said unlatching spring being stronger than said latching spring, and said unlatching spring being compressed and rendered temporarily ineffective upon energization of said conditioning solenoid.

5. A valve as defined in claim 4 including a non-magnetic separator between said armatures.

6. A valve as defined in claim 2 including a single magnetic yoke housing said solenoids, and a magnetic element between said solenoids serving as part of the magnetic circuits for both solenoids.

7. A valve comprising:
(a) a valve body formed with
   (I) a valve seat, and
   (II) an elongated opening aligned with the axis of said valve seat;
(b) a valve disk carrier slidably arranged within said opening and movable toward and away from said seat;
(c) a spring urging said carrier toward said valve seat;
(d) an actuating solenoid having an armature movable toward and away from said seat;
(e) means interconnecting said armature and carrier through which movement of said armature away from said valve seat is transmitted to said carrier, said means including parts of a latch arrangement, said latch arrangement including a shoulder presented by said valve body, and a means carried by said carrier and positionable, upon movement of said carrier away from said seat, between said carrier and valve body shoulder to prevent movement of said carrier with respect to said opening toward said seat;
(f) a conditioning solenoid having an armature movable toward and away from said seat, said conditioning solenoid armature closing the magnetic circuit of said actuating solenoid when said conditioning solenoid is deenergized and opening said magnetic circuit when said conditioning solenoid is energized; whereby energization of said actuating solenoid will not cause movement of its armature unless said conditioning solenoid is energized; and
(g) means for releasing said latch arrangement upon deenergization of said conditioning solenoid.

References Cited

UNITED STATES PATENTS

| | | | |
|---|---|---|---|
| 2,224,147 | 12/1940 | Ehlers | 251—70 |
| 2,363,117 | 11/1944 | Butler | 251—68 XR |
| 3,008,479 | 11/1961 | Mancusi | 251—74 XR |
| 3,089,507 | 5/1963 | Drake et al. | 251—68 XR |
| 3,115,330 | 12/1963 | Dollison | 251—74 XR |
| 3,294,112 | 12/1966 | Watkins | 137—456 XR |

RONALD FELDBAUM, Primary Examiner